Oct. 22, 1929.　　　　A. DOBLE　　　　1,732,462
LOCOMOTIVE
Filed March 5, 1928
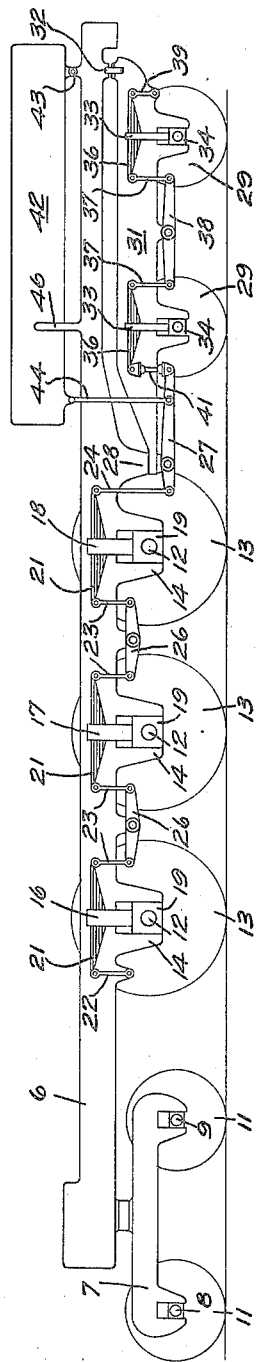
INVENTOR:
*Abner Doble*
BY *White, Prost & Fryer*
ATTORNEYS.

Patented Oct. 22, 1929

1,732,462

UNITED STATES PATENT OFFICE

ABNER DOBLE, OF BERKELEY, CALIFORNIA, ASSIGNOR TO DOBLE STEAM MOTORS CORPORATION, OF WILMINGTON, DELAWARE, A CORPORATION OF DELAWARE

LOCOMOTIVE

Application filed March 5, 1928. Serial No. 259,054.

My invention relates to locomotives and particularly to the type of locomotive in which the main frame to which the driving wheels are connected is supplemented by another frame articulated thereto. The particular field of my invention is the manner in which various bodies are disposed in the locomotive with reference to the effect of their weight on the driving wheels.

In usual locomotive construction it is customarily to support the main frame on a plurality of driving wheels which are connected between themselves and to the frame by an equalizing mechanism so that they are all equally loaded, under various conditions of operation. Furthermore, to gain the maximum traction the driving wheels are preferably always loaded to their maximum capacity, which is a fixed amount, so that the maximum tractive effort is always available. In certain types of locomotives it is desirable to carry various containers, such as the fuel tanks and the water tanks, in the main body of the locomotive itself rather than in an auxiliary vehicle, or a tender. The disadvantage of this scheme however, is that the weight of such tanks decreases materially as their contents are used, the load on the drivers is lessened, and consequently the large tractive effort available when such tanks are full is decidedly impaired when the tanks are empty.

It is therefore an object of my invention to provide means for carrying containers in the main body of the locomotive and at the same time maintain a substantially constant load on the driving wheels.

Another object of my invention is to provide means for permitting a container to be placed substantially within the main body of a locomotive and at the same time to carry the weight of the container on a supplementary truck.

The foregoing and other objects are attained in the embodiment of the invention shown in the drawings, in which The figure discloses in diagrammatic form one type of locomotive with a tank mounted thereon in accordance with my invention.

In its preferred form, the locomotive of my invention preferably comprises a main frame provided with driving wheels connected by equalizers with wheels on an auxiliary truck, together with a tank mounted adjacent the main frame and supported by the auxiliary truck.

In the drawing I disclose my invention as applied to a locomotive of the 4—6—4 type having a main frame 6. To the forward end of the frame is pivoted a bogie 7 carrying a pair of axles 8 and 9 revolving with suitable wheels 11. Immediately to the rear of the bogie are axles 12 joining pairs of wheels 13 and constrained to vertical movement in the frame by driving boxes 14.

In order to distribute the weight occurring on the main frame 6 evenly to the driving wheels 13, they are preferably all interconnected by equalizing mechanism. This preferably includes extensions 16, 17 and 18 from each of the journal boxes 19 of the axles 12. The extensions are secured to springs 21, usually of the leaf type, at their ends provided with shackles 22, 23 and 24. The front shackle 22 is pivoted to the main frame 6, while the intermediate shackles 23 are pivoted to the extremities of equalizer bars 26 in turn pivoted to the main frame.

The rear shackle 24 is usually of greater length than the others and connects with an equalizer beam 27 pivoted intermediate its ends to an extension 28 of the main frame. The rear end of the equalizer beam is joined thru linkage to the wheels 29 of a truck having a truck frame 31 underlying the main frame 6. The truck frame at its forward end is journaled on the extension 28 and is thus free to pivot laterally with respect to the main frame 6. Vertical loads are transmitted from the frame 6 to the truck frame by a roller bearing 32.

To insure that the truck wheels 29 are properly loaded, they are interconnected by equalizing linkage comprising extensions 33 from each of their journal boxes 34. The extensions are firmly secured to springs 36 whose adjacent ends are connected thru shackles 37 to an equalizer link 38 intermediate its ends pivoted to the truck frame 31. A short shackle 39 at the rear end of the rear spring 36 is pivoted to the truck frame 31 while a shackle 41 at the forward end of the front spring 36 is preferably provided with ball connections to the equalizing beam 27. In this manner, lateral movement of the truck frame 31 relative to the main frame 6 is permitted, and at the same time equalization between the various wheels can take place.

In order that the driving wheels may be constantly loaded and unaffected by the changing weight of the containers or tanks included in the body of the locomotive, such tanks are preferably supported by the truck frame 31 and the wheels 29. For example, a body or tank 42 is situated adjacent the main frame 6 and is connected thereto by hinges 43 usually disposed directly above the bearing 32. Loads on the main frame occasioned by the weight of the rear end of tank 42 and its contents are immediately transmitted thru the bearing 32 to the truck frame 31.

In accordance with my scheme, I preferably provide the forward end of tank 42 with a connecting link 44, at its upper end secured to the tank 42 and at its lower end bearing on the equalizer beam 27. Loads due to the weight of the forward end of the tank 42 and its contents are transmitted thru the connection 44 to the equalizing beam 27. The rearward end of that beam is thus urged downwardly and a consequently upward force is exerted on the forward shackle 37, acting about the center of the forward spring 36 as a fulcrum. The rear shackle 37 is urged downwardly which in turn biases upwardly the shackle 39. This tends to lift the rear end of the truck frame 31. However, such tendency is opposed by the weight of the rear end of the tank 42 transmitted thru the bearing 32. The net result is that the weight of tank 42 is borne entirely by the truck wheels 29 and the drivers 13 are in no wise disturbed.

This effect permits the tank 42 to be carried adjacent the main frame 6 in a convenient portion of the locomotive body but at the same time permits its entire weight to be borne by an auxiliary truck having lateral movement with respect to the main frame. The tank 42 is constrained against lateral movement by the hinges 43, but if additional constraint is desired or if another type of connection than hinges is desired at 43, means such as the guards 46 can be provided on the main frame 6 to lie on either side of the tank 42 and prevent lateral movement thereof.

It is to be understood that I do not limit myself to the form of the locomotive shown and described herein, as the invention, as set forth in the following claims may be embodied in a plurality of forms.

I claim:

1. A locomotive comprising a main frame, a truck frame, wheels under each of said frames, equalizers connecting said wheels and said frames, a tank, a connection between one end of said tank and said main frame, and a connection between the other end of said tank and said equalizers.

2. A locomotive comprising a main frame, truck wheels below said main frame, equalizers connecting said wheels, a tank above and movable with respect to said main frame, and a support extending from said tank directly to said equalizers.

3. A locomotive comprising a main frame, truck wheels below said main frame, a tank above said main frame, and means for transferring the weight of said tank directly to said truck wheels.

4. A locomotive comprising a main frame, a tank connected to said main frame, a truck, equalizers on said truck, and a direct, load-supporting connection between said tank and said equalizers.

5. A locomotive comprising driving wheels, truck wheels, equalizing mechanism connecting said wheels, and a tank having a portion directly supported by said equalizing mechanism.

6. In a locomotive having equalizers between the wheels, a movable tank, and a direct supporting connection between the movable tank and said equalizers.

7. A locomotive comprising a main frame, a truck frame attached to and movable relative to said main frame, wheels on said frames, equalizing mechanism connecting said wheels and accommodating said relative motion, a tank connected at one end to said main frame, and a connection between the other end of said tank and said equalizing mechanism to accommodate said relative motion.

8. A locomotive comprising a main frame, a truck frame laterally movable with respect thereto, and a body directly supported by said truck frame and constrained against lateral movement with respect to said main frame.

In testimony whereof, I have hereunto set my hand.

ABNER DOBLE.